United States Patent Office  3,335,203
Patented Aug. 8, 1967

3,335,203
RESORCINOL DERIVATIVES AND PROCESS
FOR PREPARING THEM
Walter Friedrich, Frankfurt am Main, and Gerhard Lohaus, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 1, 1964, Ser. No. 400,946
Claims priority, application Germany, Oct. 8, 1963, F 40,936
11 Claims. (Cl. 260—953)

The present invention relates to new organic compounds and to a process for preparing them; more particularly, it relates to new organic compounds containing at least one grouping of the formula

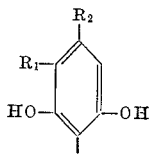

in which $R_1$ and $R_2$ represent a hydrogen atom or an alkyl radical.

Now we have found that organic compounds containing at least one grouping of the formula

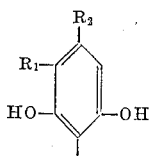
(I)

in which $R_1$ and $R_2$ represent a hydrogen atom or an alkyl radical, can be prepared by treating compounds containing at least one grouping of the formula

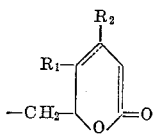
(II)

in which $R_1$ and $R_2$ are defined as above and the methylene group is bound to an activating group attracting electrons, with strong bases.

As suitable activating groups attracting electrons there may be mentioned, for example, cyano, aryl, arylmercapto, carbalkoxy, sulfinyl, sulfonyl, nitro, phosphono, phosphinyl and carbonyl groups.

The following equations serve to illustrate the reaction. They exemplify the preparation of resorcinol derivatives containing grouping (I) by rearrangement of compounds containing grouping (II):

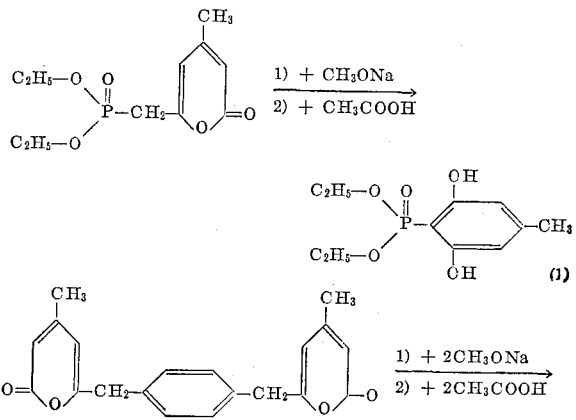

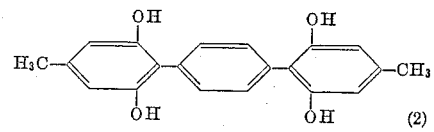
(2)

As starting materials capable of being rearranged according to the process of the invention there may be mentioned, for example, the following compounds:

4-methyl-6-benzyl-pyrone-(2);
phenyl-[pyrone-(2)-6-yl-methyl]-sulfone;
4,5-dimethyl-6-(4'-chloro-benzyl)-pyrone-(2);
4-methyl-6-(4'-nitro-benzyl)-pyrone-(2);
4-methyl-6-cyanomethyl-pyrone-(2);
phenyl-[4-methyl-pyrone-(2)-6-yl-methyl]-sulfide;
phenyl-[4-methyl-pyrone-(2)-6-yl-methyl]-sulfoxide;
n-butyl-[-methyl-pyrone-(2)-6-yl-methyl]-sulfoxide;
phenyl-[4-methyl-pyrone-(2)-6-yl-methyl]-sulfone;
3'-nitro-phenyl-[4-methyl-pyrone-(2)-6-yl-methyl]-sulfone;
4-isopropyl-6-carbethoxymethyl-pyrone-(2);
phenyl-[4-ethyl-5-methyl-pyrone-(2)-6-yl-methyl]-sulfone;
phenyl-[4-ethyl-pyrone-(2)-6-yl-methyl]-sulfone;
dodecy-[4-methyl-pyrone-(2)-6-yl-methyl]-sulfone;
4-ethyl-5-methyl-6-acetonyl-pyrone-(2);
[4-methyl-pyrone-(2)-6-yl]-methane-phosphonic acid diethylester;
4-isopropyl-5-methyl-6-[diaryl-phosphinyl-methyl]-pyrones-(2), for example
4-isopropyl-5-methyl-6-[diphenyl-phosphinyl-methyl]-pyrone-(2);
1,4-di[4'-methyl-pyrone-(2')-6'-yl-methyl]-benzene;
di-[4-methyl-pyrone-(2)-6-yl-methyl]-sulfide;
di-[4-ethyl-5-methyl-pyrone-(2)-6-yl-methyl]-sulfoxide;
di-[4-methyl-pyrone-(2)-6-yl-methyl]-sulfone.

For the rearrangement, at least 1 mol of base is required for each active methylene group of the compound used containing grouping (II) mentioned above. As suitable bases there may be mentioned alkali metal or alkaline earth metal hydroxides, alcoholates, amides or hydrides, for example sodium hydroxide, barium hydroxide, sodium methylate, potassium tert.-butylate, sodium amide or lithium hydride.

The reaction may be carried out in the presence or in the absence of a solvent. As solvents there are preferably used polar compounds, for example water, lower alcohols, N-methylpyrrolidone, dimethylformamide, dimethylsulfoxide or tetramethylenesulfone.

Reaction temperatures are usually in the range from 20° to 120° C., preferably between 40° and 90° C.

The rearrangement is advantageously carried out by dropwise adding the stoichiometric amount—calculated on 1 mol of grouping (II)—of the base, in dissolved state, at room temperature and in the presence of nitrogen, to a solution of the methylene active α-pyrone in one of the solvents mentioned above, and by subsequently heating the whole for 1 hour to 60° C. The reaction product is worked up by acidification and subsequent precipitation with water or by removal of the solvent and subsequent distillation.

The compounds containing at least one grouping (II) which are used as starting materials for the preparation of resorcinol derivatives according to the process of the invention are easily accessible. They may be obtained according to the process described in Belgian Patents Nos. 637,170 and 643,891 either directly by condensation of the corresponding carboxylic acid halides with α,β- or β,γ-unsaturated carboxylic acid esters in the presence of Friedel-Crafts catalysts and subsequent cyclization under the action of acid or alkaline cyclization agents, or by preparing the correspondingly substituted 6-chloromethyl-α-pyrones in the manner described by means of chloro-acetylchloride and reacting them with reactive compounds as, for example, trialkylphosphites, mercaptans or sulfinates.

When carrying out the rearrangement according to the process of the invention it is surprising that the action of strong bases on methylene active α-pyrones does not provoke ring cleavage but almost exclusively causes intramolecular aromatization. According to this process, it is now possible to prepare 2-substituted resorcinols which hitherto could not be prepared at all or only with considerable difficulties. The resorcinol derivatives obtained according to the invention represents valuable coupling components suitable, for instance, for the preparation of diazotype materials, or stabilizers for synthetics, for example oxidation stabilizers for polyolefines, or may be used as well as intermediate products for further reactions, for example, for the preparation of plant protective agents.

The following examples serve to illustrate the invention but they are not intended to limit it thereto, the parts being by weight unless otherwise stated.

Example 1

100 parts of 4-methyl-6-benzyl-pyrone-(2) are dissolved in 500 parts by volume of methanol and, during 20 minutes, 200 parts by volume of a methanolic 2.5N-sodium methylate solution are added dropwise in the presence of nitrogen at room temperature. The whole is boiled for 1 hour under reflux, mixed with 40 parts by volume of glacial acetic acid and concentrated. After addition of water the product is extracted by means of methylene chloride, the solvent is removed and, finally, the residue is distilled. 70 parts of 2,6-dihydroxy-4-methyl-diphenyl are isolated, corresponding to 70% of the theoretical yield and boiling at 145° C. at a pressure of 0.5 mm. of mercury. The compound melts at 107° C. after recrystallization in a mixture of benzene and petroleum ether.

Example 2

126 parts of phenyl-[4-methyl-pyrone-(2)-6-yl-methyl]-sulfide are reacted as described in Example 1. The yield amounts to 92 parts of phenyl-(2,6-dihydroxy-4-methyl-phenyl)-sulfide. After recrystallization in 20 parts by volume of petroleum ether the compound melts at 106–108° C. The yield amounts to 79% of the theoretical yield.

Example 3

124 parts of phenyl-[4-methyl-pyrone-(2)-6-yl-methyl]-sulfoxide are dissolved in 250 parts by volume of ethanol, 200 parts by volume of an ethanolic 2.5N-sodium ethylate solution are added in the presence of nitrogen, and the whole is heated for 30 minutes. After acidification with 50 parts by volume of glacial acetic acid warm water is added. 110 parts of phenyl-(2,6-dihydroxy-4-methyl-phenyl)-sulfoxide precipitate; they are recrystallized in a mixture of methanol and water or in benzene and melt at 140° C. with decomposition. The yield is 89% of the theoretical yield.

Example 4

132 parts of phenyl-[4-methyl-pyrone-(2)-6-yl-methyl]-sulfone are dissolved in 200 parts by volume of dimethylformamide and 100 parts by volume of a methanolic 5N-sodium hydroxide solution are added in the present of nitrogen. The whole is heated for 1 hour to 70° C., acidified and precipitated with water. 100 parts of phenyl-(2,6-dihydroxy-4-methyl-phenyl)-sulfone are obtained, corresponding to 76% of the theoretical yield. After having been recrystallized in a mixture of methanol and water the compound melts at 155–156° C.

Example 5

130 parts of [4-methyl-pyrone-(2)-6-yl methane]-phosphonic acid diethylester are treated as described in Example 1, 103 parts of (2,6-dihydroxy-4-methyl-phenyl)-phosphonic acid diethylester are obtained, boiling at 154–156° C. at a pressure of 0.5 mm. of mercury. After recrystallization in isopropyl ether the ester melts at 121° C. The yield amounts to 79% of the theoretical yield.

Example 6

81 parts of 1,4-di-[4'-methyl-pyrone-(2')-6'-yl-methyl]-benzene are dissolved in 500 parts by volume of dimethylformamide and, during 30 minutes, 200 parts by volume of a methanolic 5N-sodium methylate solution are added in the presence of nitrogen. The temperature is kept at 80° C. for 1 hour, then the solution is acidified by means of glacial acetic acid, concentrated to dryness, the residue dissolved in a 2N-sodium hydroxide solution, filtered and the product precipitated by acidification. 67 parts of 1,4-di-(2',6'-dihydroxy-4'-methyl-phenyl)-benzene are isolated, corresponding to 83% of the theoretical yield. After recrystallation in glacial acetic acid the compound melts at 318–320° C.

Example 7

60 parts by volume of a methanolic 5N-sodium methylate solution are added dropwise, in the present of nitrogen, to 28 parts of di-[4-methyl-pyrone-(2)-6-yl-methyl]-sulfide in 200 parts by volume of methanol, the whole is boiled under reflux for 30 minutes, acidified and mixed with water. 22 parts of di-(2,6-dihydroxy-4-methyl-phenyl)-sulfide precipitate, corresponding to 79% of the theoretical yield. After reprecipitating the solution of the crude product in a 2N-sodium hydroxide solution by addition of water and recrystallation in glacial acetic acid the substance melts at 250–252° C.

Example 8

31 parts of di-[4-methyl-pyrone-(2)-6-yl-methyl]-sulfone are treated as described in Example 7. 21 parts of di-(2,6-dihydroxy-4-methyl-phenyl)-sulfone are obtained, corresponding to 68% of the theoretical yield. After recrystallization in a mixture of dimethylformamide and water the compound melts at 300° C.

We claim:

1. Compound of the formula

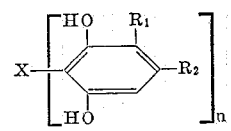

wherein $R_1$ represents hydrogen or lower alkyl, $R_2$ represents lower alkyl, $n$ stands for one of the integers 1 or 2, X represents cyano, phenyl, nitrophenyl, chlorophenyl, phenylmercapto, lower alkylsulfoxy, phenylsulfoxy, alkylsulfone, phenylsulfone, nitrophenylsulfone, carboxylic acid lower alkyl ester, phosphonic acid lower dialkyl ester, diphenylphosphine or lower acyl when $n=1$, or X represents 1,4-phenylene, thio, sulfoxy or sulfonyl when $n=2$.

2. The compound of the formula

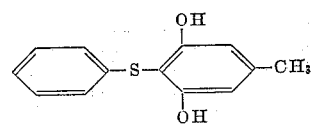

3. The compound of the formula

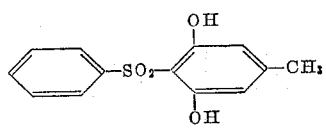

4. The compound of the formula

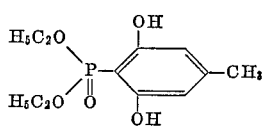

5. The compound of the formula

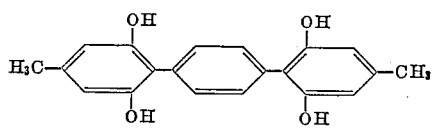

6. The compound of the formula

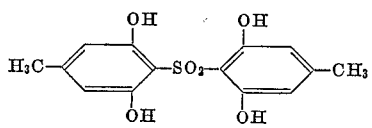

7. A process for preparing compounds of the formula

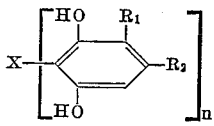   (I)

wherein $R_1$ represents hydrogen or lower alkyl, $R_2$ represents lower alkyl, $n$ stands for one of the integers 1 or 2, X represents cyano, phenyl, nitrophenyl, chlorophenyl, phenylmercapto, lower alkylsulfoxy, phenylsulfoxy, alkylsulfone, phenylsulfone, nitrophenylsulfone, carboxylic acid lower alkyl ester, phosphonic acid lower dialkyl diester, diphenylphosphinyl or lower acyl when $n=1$, and X represents 1,4-phenylene, thio, sulfoxy or sulfonyl when $n=2$, which comprises treating a compound of the formula

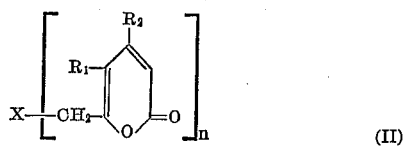   (II)

wherein $R_1$, $R_2$, X and $n$ are defined as above, with at least the stoichiometric amount of a strong base, calculated on the compound of the Formula II, at a temperature within the range from 20° to 120° C. in the presence of a nitrogen atmosphere.

8. A process as claimed in claim 7 the base used is a member selected from the group consisting of hydroxides, alcoholates, amides and hydrides of alkali metals and alkaline earth metals.

9. A process as claimed in claim 7 the reaction is carried out in the presence of a solvent having high polarity.

10. A process as claimed in claim 9, wherein the solvent used is a member selected from the group consisting of water, a lower alcohol, N-methylpyrrolidone, dimethylformamide, dimethylsulfoxide and tetramethylenesulfone.

11. A process as claimed in claim 7, wherein the reaction is carried out at a temperature within the range from about 40° C. to about 90° C.

References Cited

UNITED STATES PATENTS
2,553,417   5/1959   Ladd et al. _____ 260—953 X

OTHER REFERENCES
Aleykutty et al., "Chem. Abst.," vol. 50, col. 12038 (1956).

Mehta et al., "Chem. Abst.," vol. 43, col. 9067 (1949).

CHARLES B. PARKER, *Primary Examiner.*

FRANK M. SIKORA, ANTON H. SUTTO,
*Assistant Examiners.*